2 Sheets--Sheet 1.
J. FREY & J. M. EICHHOLTZ.
Sawing-Machine.
No. 6,586. Reissued Aug. 10, 1875.
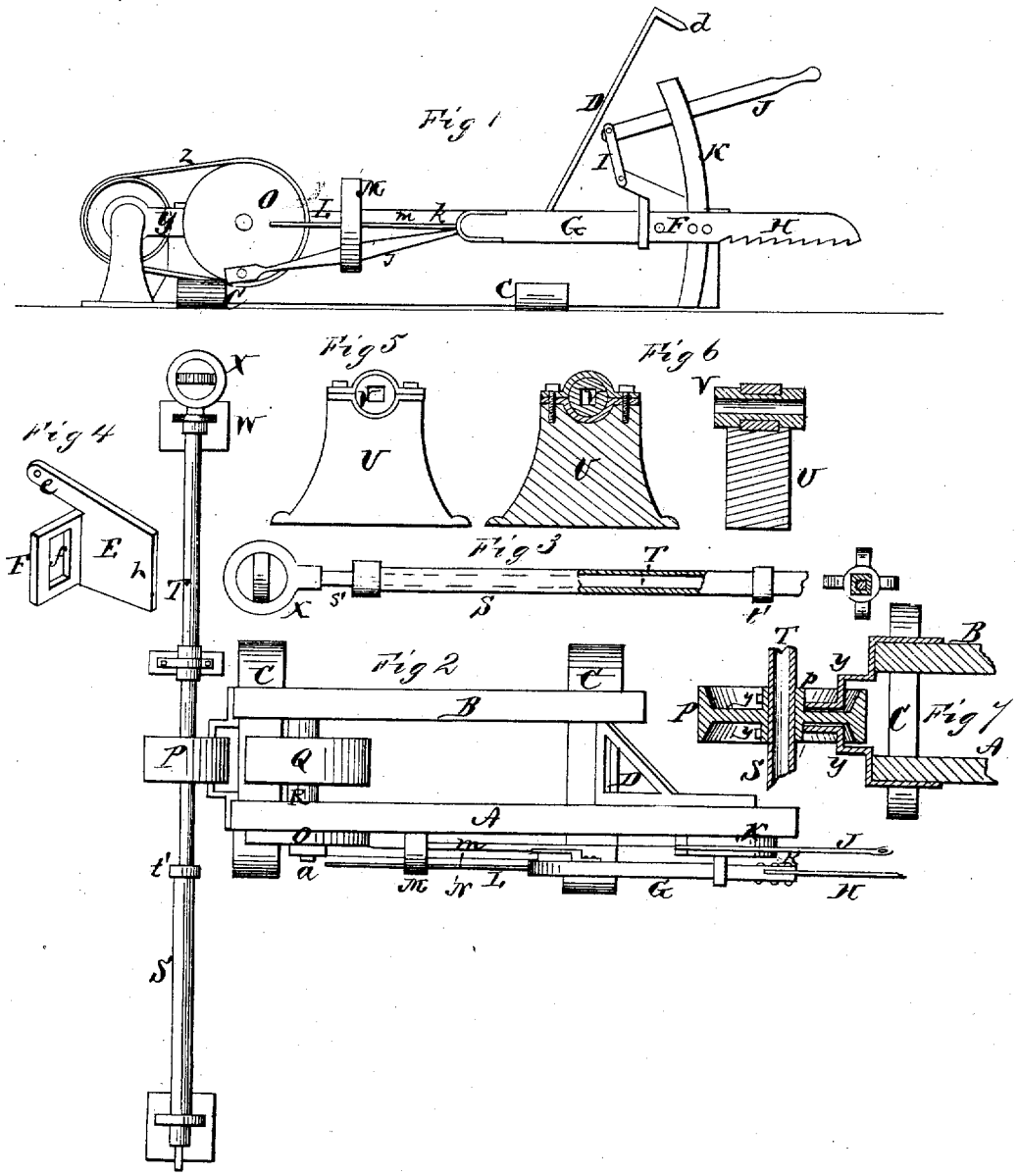
WITNESSES.
Francis L. Durand
C. L. Emerh.
INVENTOR
John Frey
John M. Eichholtz.
By Alexander Mason
Attorneys.
N. PETERS, PHOTO-LITHOGRAPHER, WASHINGTON, D. C.

J. FREY & J. M. EICHHOLTZ.
Sawing-Machine.
No. 6,586. Reissued Aug. 10, 1875.
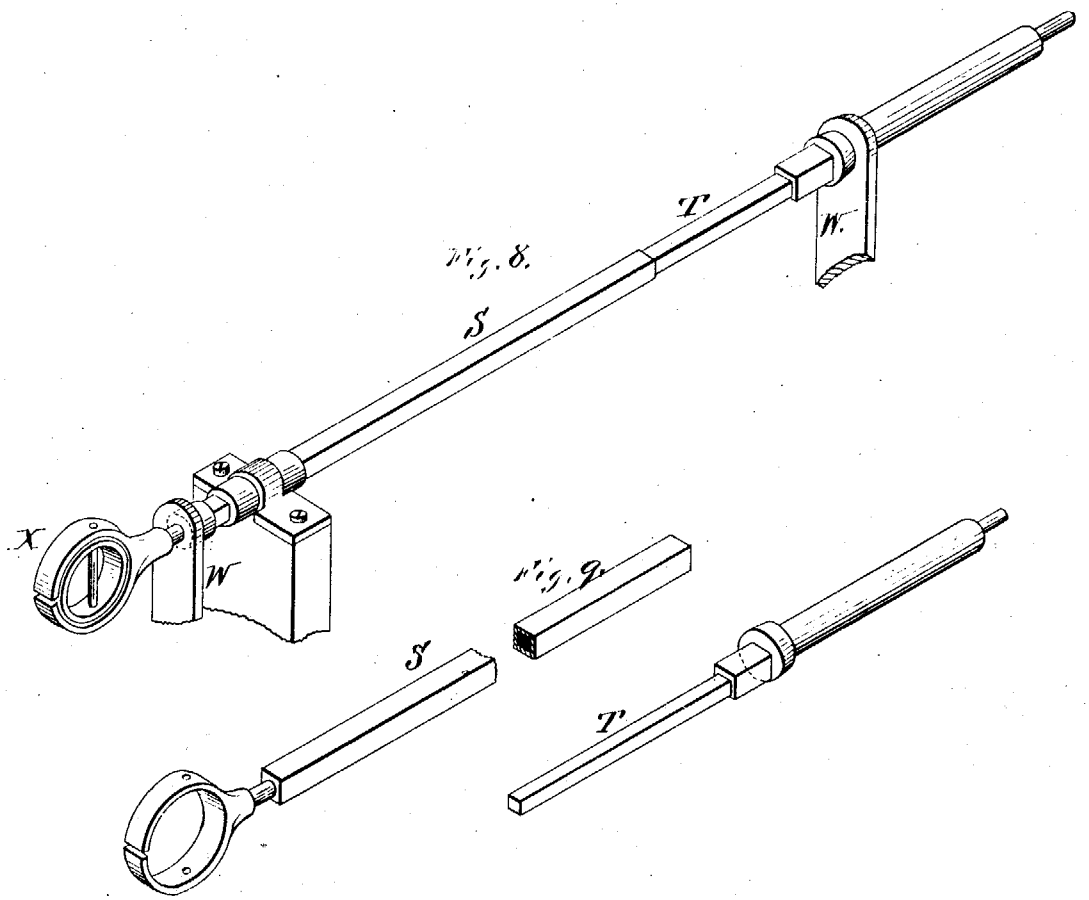
WITNESSES.
Franck L. Durand
C. L. Emmons
INVENTOR
J. Frey & J. M. Eichholtz
By Alexander Mason
Attorneys.
N. PETERS, PHOTO-LITHOGRAPHER, WASHINGTON, D. C.

UNITED STATES PATENT OFFICE.

JOHN FREY, OF OSNABURG, AND JOHN M. EICHHOLTZ, OF CANTON, OHIO, ASSIGNORS TO WILLIAM DETRICK.

IMPROVEMENT IN SAWING-MACHINES.

Specification forming part of Letters Patent No. 81,356, dated August 25, 1868; reissue No. 6,586, dated August 10, 1875; application filed November 26, 1873.

*To all whom it may concern:*

Be it known that we, JOHN FREY, of Osnaburg, in the county of Stark and State of Ohio, and JOHN M. EICHHOLTZ, of Canton, in the county of Stark and State of Ohio, have invented new and useful Improvements in Sawing-Machines; and we do hereby declare that the following is a full, clear, and exact description of our invention, reference being had to the original drawings, forming a part of this specification, and the letters of reference marked thereon, of which drawings—

Figure 1 is an elevation of our improved sawing-machine. Fig. 2 is a plan of the same, with driving-belt removed. Fig. 3 is a detail view of the extension-rod or driving-shaft. Fig. 4 is a perspective view of the saw-guide supporter. Fig. 5 is an elevation of the movable supporter for the extension-rod or driving-shaft. Fig. 6 are central vertical longitudinal and transverse sections of the same. Fig. 7 is a horizontal section taken through the extension-rod or driving-shaft and auxiliary pulley, and the rear of the saw-frame, showing the mode of combining the same.

Our invention relates to certain improvements in the construction and arrangement of certain parts of a sawing-machine, and the application of an extension-rod or driving-shaft, which connects the motive power to the sawing-machine, whereby we are enabled to move the sawing-machine and its immediate connections along the side of the log to be sawed, without changing the position of the motive power, which is of great advantage in sawing logs in the forest, or elsewhere where the moving of the motive power is very inconvenient, and the log too heavy to be handled without great power; said improvements consisting, first, in the modes of constructing the extension-rod or driving-shaft, and the manner of applying the same to a sawing-machine. The extension-rod or driving-shaft is made in two or more parts, the one sliding into the other, whereby the shaft may be made of a moderate length, or may be extended into a long shaft, where the length of the log to be sawed requires it, without the loss of time that would result from bolting on an extra shaft, or of moving the log upon rollers to the saw, or of moving the motive power up to the sawing-machine.

To enable others skilled in the art to make and use our invention, we will proceed to describe its construction, application, and operation.

A and B represent the main side pieces of the saw-frame, which are united by sills C C, as shown. In these side pieces is hung the crank-shaft R, which is provided with the pulley Q (if the auxiliary pulley P is used) and crank-wheel O, with crank-pin *a*. The radial arm *k* is pivoted to the side piece A by bolt *m*, and has the saw-guide supporter E F attached to its front end. The guides K K are curved to a circle, with its center at *m*, and have a space between them, in which the front end *h* of the saw-guide E F works, by which the said guide is caused to move up and down in a vertical plane. The lever J is hung between the top ends of the guides K K, and is connected by a link, I, to the arm *e* of the saw-guide E F, so that, by working the lever J, the saw may be raised or lowered, as desired. The saw-bar G has the saw H inserted in its front end, and works through the hole *f* in the side-plate F of the saw-guide supporter E F. At the rear end of the saw-bar G is attached the guide-rod L, as shown, which works in a box which is pivoted to the inner face of the outer part of the O-shaped iron M. The pitman N is pivoted to the saw-bar G by means of a plate and bolt, as shown, and is attached to the crank-pin *a*, as shown. An iron, D, of the form shown, is pivoted between the side pieces A B, and is provided at the front end with a point, which is driven into the log to be sawed, thus serving to steady the main frame of the machine. The arms Y Y are attached to the rear ends of the side pieces A B, and have the circular ends *y y*, in which are made round holes, which receive the ends *p p* of the axle of the auxiliary pulley P, and form the boxes for same, as shown in detail in Fig. 7. A belt, Z, runs around the auxiliary pulley P and the pulley O on the crank-shaft R, and thus serves to communicate motion to the saw.

It is readily seen that by this mode of hanging the auxiliary pulley P in the arms Y Y, attached to the frame A B, the relation of the two pulleys to each other is not changed when the sawing-machine is moved along the extension-rod, as the pulley P slides along the rod T by means of the square hole in the center of the pulley P; consequently the action of the belt Z remains unchanged during any movement of the machine. The auxiliary pulley P is arranged at the end of the machine, so that the extension-rod S T can cross the machine behind the crank-shaft at a sufficient distance to allow the crank and pitman to work without hitting the rod.

The extension-rod S T is of peculiar construction, the part S consisting of a square hollow tube with a journal and universal joint, *x*, at its end, while the part T consists of a round part, T′, a square part, T, of the same size as the outer surface of the tube S, a collar, *t′*, between the round portion T′ and the square portion T, and a square part, *t*, of the same size as the interior of the tube S, into which it fits, as seen in Figs. 2, 3, and 7. A movable support, U, having a collar, V, with a square hole, *v*, of the same size as the shaft T, hung in a box at its top, is used in combination with the extension-rod S T, to support it in the middle, and thus prevent it from wabbling. The shaft-posts W W are made with feet, as shown, or in any other suitable manner, and serve as bearings for the shaft, as shown.

The power is communicated to the sawing-machine by having the extension-rod coupled to the motive power, and the square portion passing through the square hole in the axle of the auxiliary pulley P.

This construction of the extension-rod S T is for the purpose of communicating the power to the auxiliary pulley P, which is arranged, as before described, at the rear end of the sawing-machine, so as not to interfere with the crank and pitman while in motion.

The operation of our machine is readily seen: The extension-rod S T is placed parallel with the log to be sawed, and at a suitable distance from the log, to allow a space for the sawing mechanism A B C, which sits with the end piece A against the log, the whole being so arranged that the auxiliary pulley P shall be close to the collar *s′* of the extension-rod T at the first cut of the log, which extends the direction of the extension-rod S T. T point *d* is driven into the log, the saw H lo ered by the lever J, and the first cut mad The saw is then raised, the point *d* drawn o of the log, and the main frame of the machi A B C slid along the ground until in positi for another cut, and in the same manner t operation is continued until the whole log cut up.

The auxiliary pulley P slides along the e tension-rod S T until it strikes the collar when the part *t* commences to slide out of th tube S, and this is continued until the part is nearly out of the tube S—the tube S bein supported by the supporter U V, and the fo ward part W being moved forward wheneve the collar *t′* comes up to it.

It is readily seen that this arrangement al lows of the sawing of a very long log withou moving the motive power, the length of th log sawed depending on the length of the ex tension-rod S T.

We do not broadly claim the extension-rod as that has been used before for other purposes.

What we claim as new and useful is—

1. The extension-rod S T, composed of the tube S, with journals *s*, and shaft *t* T T′, when used in combination with the auxiliary pulley P of a sawing-machine, said pulley being maintained in its relative position to the machine by means of the arms Y Y, the extended ends of which form the boxes of the auxiliary pulley P, substantially as and for the purpose specified.

2. The movable sawing-machine, substantially as herein described, in combination with the extension-rod S T, as specified.

In testimony that we claim the foregoing we have hereunto set our hands this 17th day of May, 1873.

JOHN FREY.
JOHN M. EICHHOLTZ.

Witnesses:

GEORGE E. BALDWIN,
R. S. SHIELDS.